US007963808B2

(12) United States Patent
Miyamoto

(10) Patent No.: US 7,963,808 B2
(45) Date of Patent: Jun. 21, 2011

(54) ELECTRONIC APPARATUS

(75) Inventor: Tomofumi Miyamoto, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 230 days.

(21) Appl. No.: 12/059,848

(22) Filed: Mar. 31, 2008

(65) Prior Publication Data
US 2008/0266784 A1 Oct. 30, 2008

(30) Foreign Application Priority Data

Apr. 26, 2007 (JP) ................. 2007-117386

(51) Int. Cl.
*H01R 13/627* (2006.01)
(52) U.S. Cl. ....................... 439/677; 439/681
(58) Field of Classification Search .......... 439/676, 439/677, 681, 135
See application file for complete search history.

(56) References Cited

U.S. PATENT DOCUMENTS

| 5,161,998 A * | 11/1992 | Defibaugh et al. ............ 439/544 |
| 5,462,455 A * | 10/1995 | Reichle ....................... 439/681 |
| 6,821,159 B2 * | 11/2004 | Munger et al. ................ 439/680 |
| 6,908,344 B1 * | 6/2005 | Ahmed et al. ................ 439/677 |
| 7,425,141 B2 * | 9/2008 | Kanayama et al. ........... 439/135 |
| 2002/0141149 A1 | 10/2002 | Homer et al. |
| 2006/0240715 A1 * | 10/2006 | Zueck et al. .................. 439/681 |

FOREIGN PATENT DOCUMENTS

| CN | 1875525 | 12/2006 |
| JP | 2001326033 | 11/2001 |
| JP | 200384867 | 3/2003 |
| WO | 2005/046008 | 5/2005 |

OTHER PUBLICATIONS

Chinese Patent Application No. 2008100910444, The First Office Action, mailed Mar. 24, 2010.

* cited by examiner

*Primary Examiner* — Hien Vu
(74) *Attorney, Agent, or Firm* — Blakely Sokoloff Taylor & Zafman

(57) ABSTRACT

According to one embodiment, an electronic apparatus is configured to be provided with a communication line socket provided on a backside surface of a casing of the electronic apparatus, metallic terminals provided in the communication line socket, and abutment sections each of which is provided in the vicinity of the communication line socket, and is given a predetermined height from the metallic terminals in an insertion direction of the communication line socket. By virtue of the above configuration, even if it is tried to insert a wrong plug into the communication line socket by mistake, the wrong plug abuts against the abutment sections, and the insertion is stopped on the way.

4 Claims, 5 Drawing Sheets

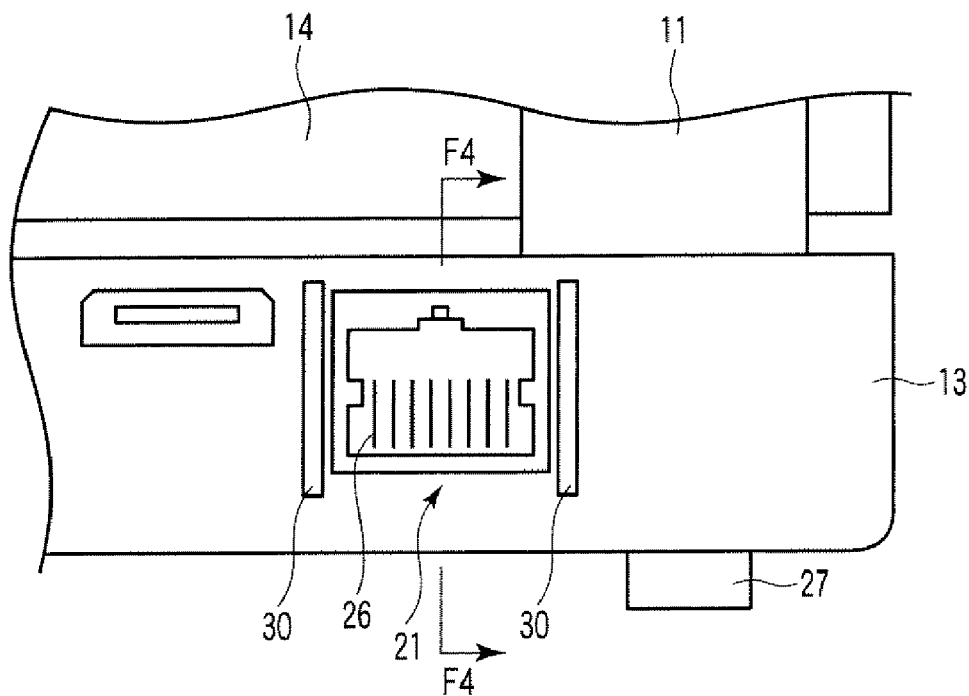
F I G. 3
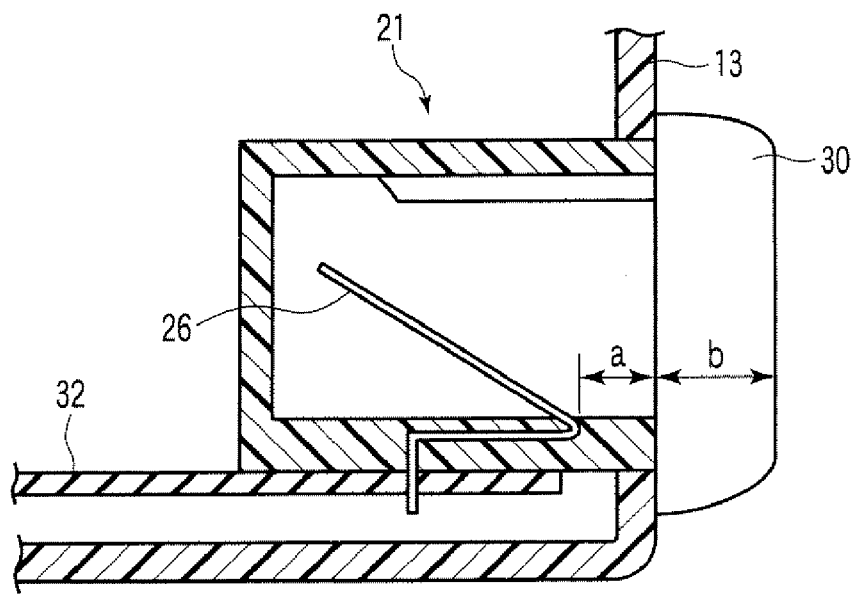
F I G. 4

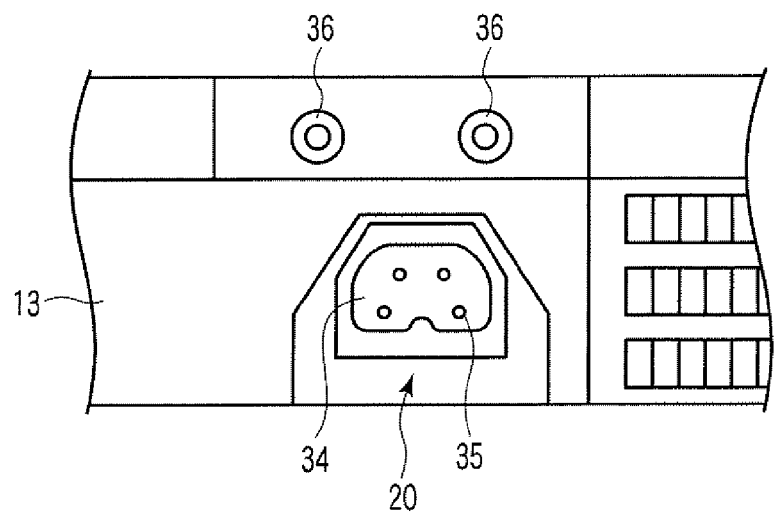
F I G. 5
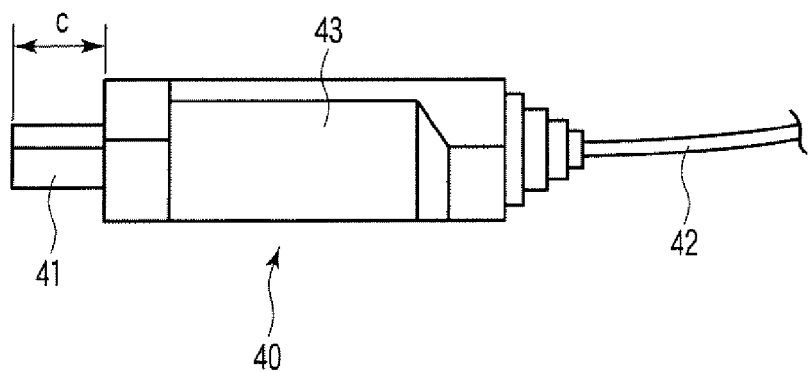
F I G. 6
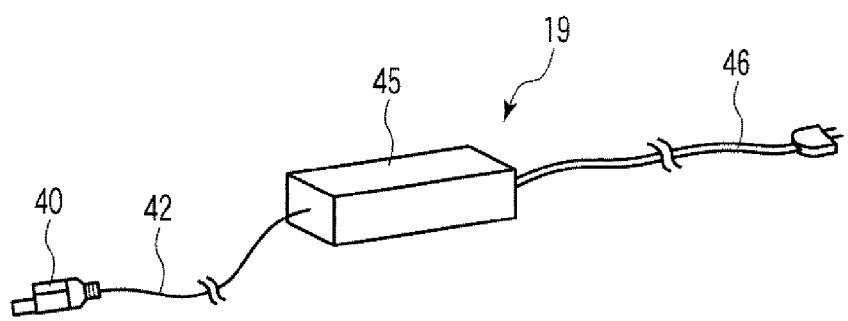
F I G. 7

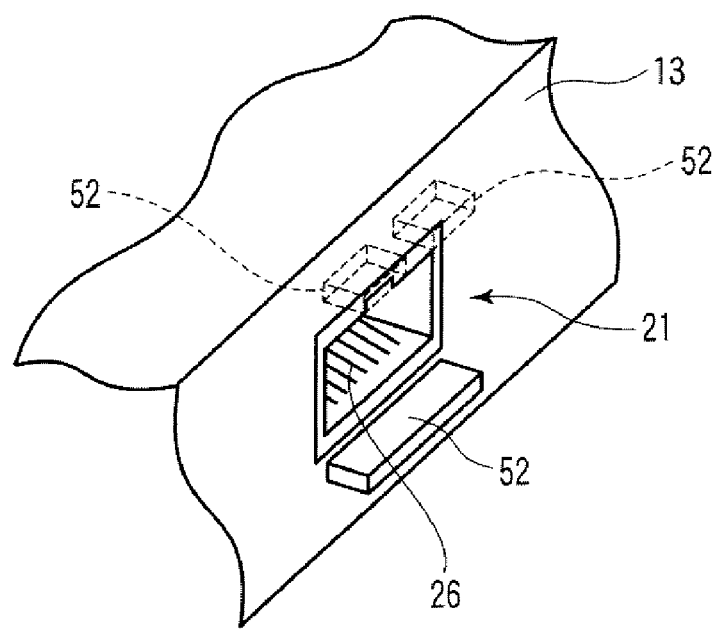
F I G. 10
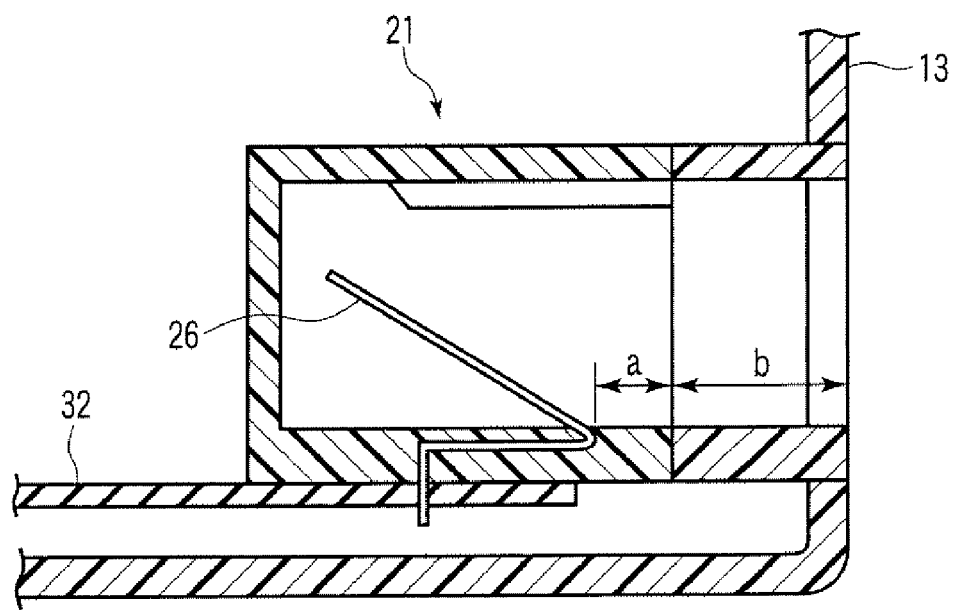
F I G. 11

ELECTRONIC APPARATUS

CROSS-REFERENCE TO RELATED APPLICATIONS

This application is based upon and claims the benefit of priority from Japanese Patent Application No. 2007-117386, filed Apr. 26, 2007, the entire contents of which are incorporated herein by reference.

BACKGROUND

1. Field

One embodiment of the present invention relates to a portable electronic apparatus such as a portable computer.

2. Description of the Related Art

In recent years, the number of instances of portable computers being used as a video apparatus has increased. That is, a way of usage in which a portable computer is provided with a large-sized display screen, a high-capacity hard disk and a DVD device for reproducing, recording, and editing images is on the increase.

Further, in general, when such a portable computer is used, a voltage step-down device for stepping down a voltage of commercial power is connected to the portable computer. That is, the voltage of the commercial power is stepped down to a low voltage, such as 6V or 12V, and a plug for outputting the low voltage is inserted into a socket on the portable computer side, thereby supplying power to the portable computer.

However, when a portable computer with a large screen is used as a video apparatus, the amount of power required becomes large. Thus, a problem has been caused that the required power cannot be supplied to the portable computer through the plug that has heretofore been used for the conventional stepping-down device. Thus, a plug in which the permissible current amount is increased by increasing the number of terminals of the plug section is used.

Further, in Jpn. Pat. Appln. KOKAI Publication No. 2001-326033, an invention relating to an insertion side connector is described in which a different projection is provided for each signal line, thereby distinguishing the signal lines from each other.

However, the cross-sectional shape of the power source line plug section closely resembles the cross section of the communication line plug section, and there has been a case where the power source line plug section can be inserted into the communication line socket. Furthermore, both the power source line socket and the communication line socket are often arranged on the backside surface of an electronic apparatus such as a portable computer and the like. Thus, when a power source line plug is blindly inserted into a power source line socket, the power source line plug may be mistakenly inserted into the communication line socket.

Inside the communication line socket, a plurality of metallic terminals to be connected to a communication line plug are provided, and if the power source line plug is inserted into the communication line socket by mistake, the metallic terminals are bent by the insertion of the power source line plug. Moreover, if the bend of the metallic terminals cannot be restored, there is caused a problem that a need for replacement of the circuit board occurs.

Further, the projections described in Jpn. Pat. Appln. KOKAI Publication No. 2001-326033 are provided only for the purpose of discriminating the types of the signal lines, and are not provided so as to prevent a foreign signal line plug from being mistakenly inserted into the socket.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary front view showing an example of a communication line socket;

FIG. 4 is an exemplary cross-sectional view showing the example of the communication line socket;

FIG. 5 is an exemplary front view showing an example of a power source line socket;

FIG. 6 is an exemplary side view showing an example of a power source line plug;

FIG. 7 is an exemplary perspective view showing a voltage step-down device;

FIG. 10 is an exemplary perspective view showing another example of the abutment section; and FIG. 11 is an exemplary perspective view showing a further example of the abutment section.

DETAILED DESCRIPTION

Various embodiments according to the invention will be described hereinafter with reference to the accompanying drawings. In general, according to one embodiment of the invention, a communication line socket, which is provided on a backside surface of a casing of the electronic apparatus into which a communication line plug is inserted so that the plug can be freely inserted into and pulled out of the socket, and in which the inserted communication line plug and metallic terminals provided in the communication line socket are electrically connected to each other; and abutment sections, each of which is given a predetermined height from the metallic terminals, and is provided in the vicinity of the communication line socket.

Figure 1:
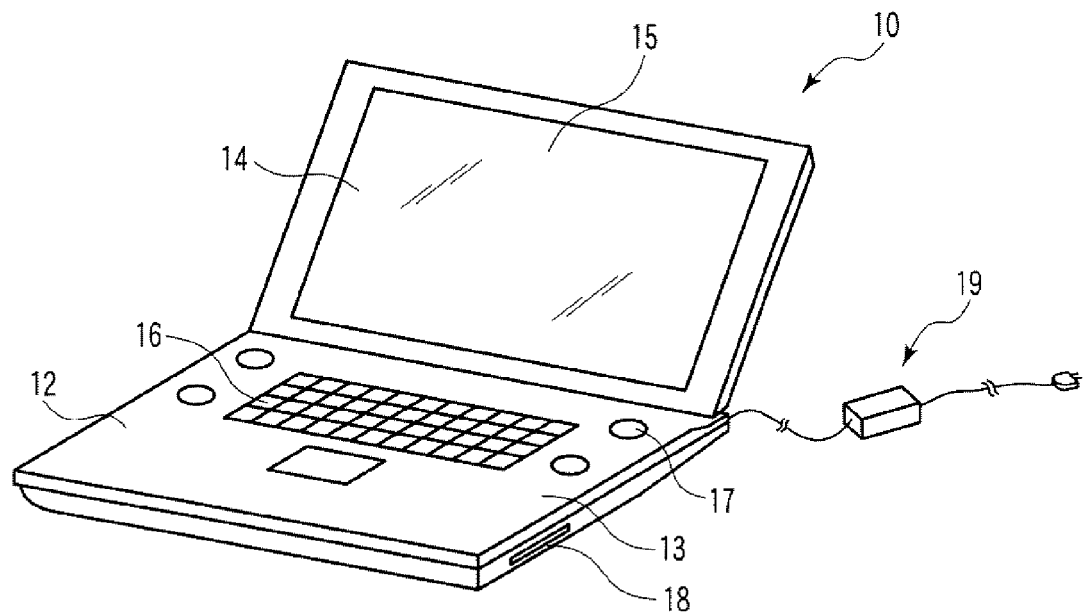
FIG. 1 is an exemplary perspective view showing an embodiment of a portable computer according to the present invention.

FIG. 1 shows a portable computer 10 as an electronic apparatus. The portable computer 10 is constituted of a computer main body 12, a display unit 14, and a voltage step-down device 19.

Figure 2:
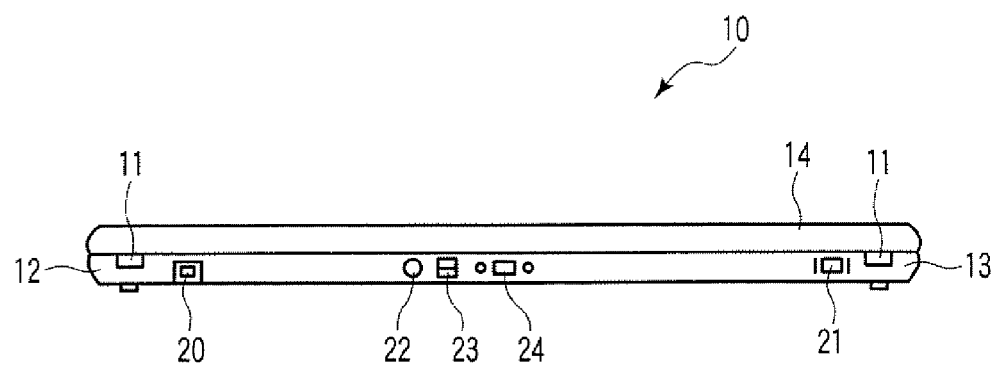
FIG. 2 is an exemplary rear view showing the embodiment of the portable computer shown in FIG. 1.

The computer main body 12 is provided with a casing 13 made of a synthetic resin at the external surface, and a keyboard 16, and a speaker 17 at the top surface of the casing 13. The casing 13 is flat, and, for example, a socket 18 shown in FIG. 1 and the like into which various card type electronic devices are inserted are provided on the side surface. Further, on the backside surface of the casing 13, on the left as one faces it, a power source line socket 20 is provided, and a communication line socket 21 is provided on the right as shown in FIG. 2. Further, on the backside surface of the casing 13, connection ports 22 and 24 for various signals, and a USB connection port 23 and the like are provided between the power source line socket 20 and the communication line socket 21. Further, inside the computer main body 12, a high-capacity hard disk and a DVD device (neither of them are shown) are provided.

The display unit 14 includes a display panel 15 constituted of a liquid crystal display device or the like, and is attached to the computer main body 12 by means of hinges 11 (shown in FIG. 2) so as to be openable and closable. FIG. 1 shows a state where the display unit 14 is opened with respect to the computer main body 12, and FIG. 2 shows a state where the display unit 14 is closed with respect to the computer main body 12.

The communication line socket 21 is, for example, an RJ-45 connector, and is provided at the right end part on the backside surface of the casing 13 as shown in FIG. 3. A reference symbol 27 denotes a leg section for supporting the computer main body 12. The communication line socket 21 includes a rectangular hole corresponding to the communication line plug (not shown), and a plurality of wire-shaped metallic terminals 26 are provided inside the hole. FIG. 4 shows a cross-sectional view taken along line F4-F4 in FIG. 3.

As shown in FIG. 4, the metallic terminals 26 are attached to the bottom section of the communication line socket 21, and are bent toward the inner part of the socket 21, i.e., in the insertion direction of the communication line plug. The other end part of each of the metallic terminals 26 penetrates the bottom section of the communication line socket 21, and is fixed to the surface of the circuit board 32 by soldering.

When the communication line plug is inserted into the communication line socket 21, the terminals of the communication line plug are brought into contact with the metallic terminals 26. Further, signal lines connected to the communication line plug are connected to the portable computer 10. Further, as shown in FIG. 4, a distance from a part of the metallic terminal 26 closest to the entrance side of the communication line socket 21 to the surface position of the backside surface of the casing 13 is 'a'.

Furthermore, on both the right and left sides of the communication line socket 21, projection pieces 30 serving as abutment sections are provided as shown in FIG. 3. The right and left projection pieces 30 are formed so as to be parallel with each other, and perpendicular to the backside surface of the casing 13. That is, the projection pieces 30 extend in the insertion direction of the communication line plug to the communication line socket 21 toward the backside surface of the portable computer 10. The projection pieces 30 are formed integral with the casing 13. Each of the projection pieces 30 is formed such that a height from the surface position of the backside surface of the casing 13 to the maximum height position of each of the projection pieces 30 is 'b'. Incidentally, the projection pieces 30 need not be integral with the casing 13, and may instead be formed separate from each other so as to be attached to the casing 13.

The power source line socket 20 is provided with a roughly semicircular hole 34 as shown in FIG. 5. In the hole 34, four power source connection terminals 35 are provided. Reference symbols 36 in FIG. 5 denote two circular sockets provided above the power source line socket 20. FIG. 6 shows a power source line plug 40 to be inserted into the power source line socket 20. As shown in FIG. 7, the power source line plug 40 is connected to an output cord 42 of the voltage step-down device 19. The voltage step-down device 19 is constituted of a connection cord 46 provided with a plug to be connected to the commercial power supply, a step-down section 45 for stepping down the voltage of the commercial power supply to a predetermined voltage, and a power source line plug 40 serving as an output plug, and the like.

As shown in FIG. 6, the power source line plug 40 is constituted of an insertion section 41 to be inserted into the power source line socket 20, and a finger grip section 43 which is continuous from the insertion section 41 and is of an appropriate size, e.g., a size suitable for grasping by hand. The cross sectional shape of the insertion section 41 is formed in such a manner that the cross-sectional shape thereof is a shape complying with the shape of the hole 34 of the power source line socket 20, whereby the insertion section 41 can be inserted into the hole 34. Furthermore, the cross-sectional shape of the insertion section 41 is a shape that enables the insertion section 41 to be also inserted into the communication line socket 21. Further, a length from the distal end of the insertion section 41 to a border between the insertion section 41 and the finger grip section 43 is 'c'. The length 'c' is given a relationship c<a+b.

When the power source line plug 40 is inserted into the power source line socket 20, the terminals 35 and terminals (not shown) provided inside the power source line plug 40 are brought into contact with each other, and power is supplied to the portable computer 10 at a predetermined voltage through the step-down section 45.

Further, the finger grip section 43 is formed such that the cross sectional shape thereof is larger than the cross sectional shape of the insertion section 41. An end face formed at the border between the finger grip section 43 and the insertion section 41 is substantially flat, and is formed into such a shape that when the insertion section 41 is inserted into the communication line socket 21, the end face abuts against the tips of both the projection pieces 30 without fail.

Next, the function and effect of the portable computer 10 will be described below.

First, the display unit 14 of the portable computer 10 is rotated from the computer main body 12 and the display unit 14 is caused to rise from the computer main body 12. Further, the power source line plug 40 is brought to the backside surface of the portable computer 10, and then insertion of the plug 40 into the power source line socket 20 is attempted in a blind manner.

In this case, when it is intended to insert the power source line plug 40 into the power source line socket 20, if left and right are confused, the power source line plug 40 is inserted into the communication line socket 21. However, the projection pieces 30 are provided in the vicinity of the communication line socket 21, and hence even when insertion of the power source line plug 40 into the communication line socket 21 is attempted, the end face of the finger grip section 43 abuts against the projection pieces 30.

Figure 8:
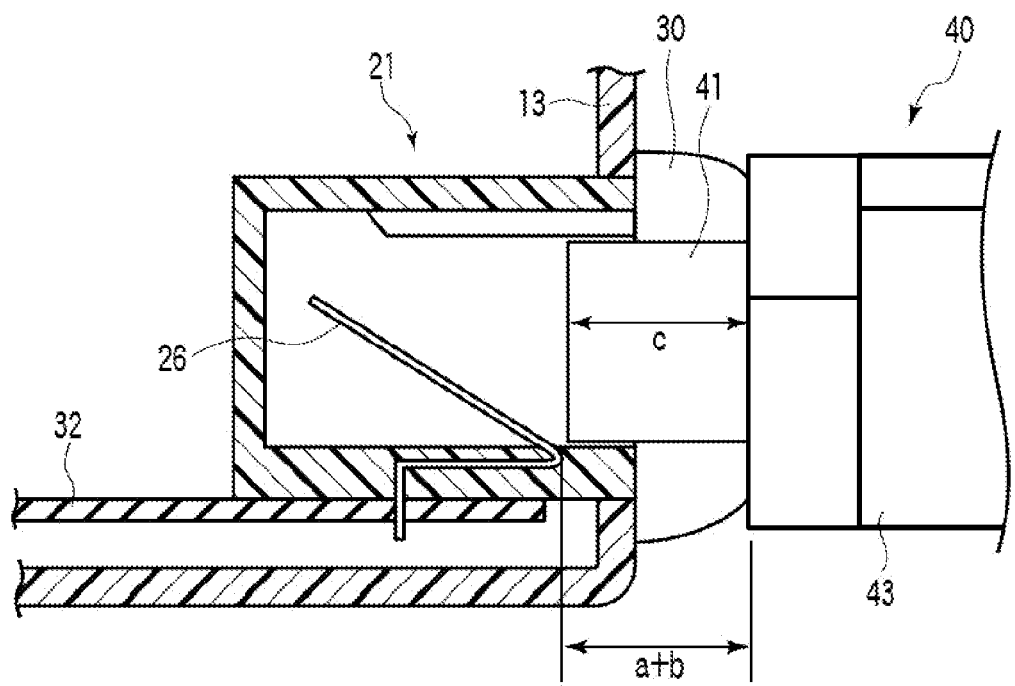
FIG. 8 is an exemplary partial cross-sectional view showing a state where the power source line plug is inserted into the communication line socket.

As a result, after the finger grip section 43 abuts against the projection pieces 30, it becomes impossible to insert the power source line plug 40 into the communication line socket 21 any more. The length of the insertion section 41 of the power source line plug 40 is 'c', and the distance from the tip of the projection piece 30 to the metallic terminal 26 is a+b, which is larger than 'c'. Accordingly, as shown in FIG. 8, the distal end of the power source line plug 40 cannot reach the metallic terminals 26. Therefore, the metallic terminals 26 cannot be pressed and damaged by the insertion section 41 of the power source line plug 40.

Figure 9:
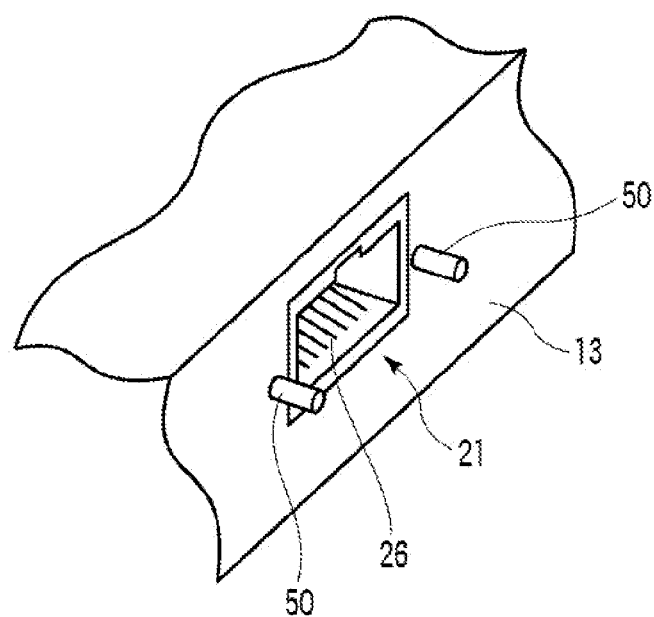
FIG. 9 is an exemplary perspective view showing another example of an abutment section.

FIG. 9 shows another example of the abutment section. In this example, the projection section 50 serving as the abutment section is formed into a cylindrical shape. When the projection sections 50 are made cylindrical as described above, and are formed in the vicinity of the communication line socket 21 too, if insertion of the power source line plug 40 into the communication line socket 21 is attempted, the insertion is stopped by the projection sections 50. Thus, it is possible to prevent the metallic terminals 26 from being damaged by the power source line plug 40.

FIG. 10 shows an example in which projection pieces 52 serving as the abutment sections are provided above and below the communication line socket 21. Further, the projection piece 52 provided above the socket 21 is split into two pieces, right and left, so as to avoid the center. Incidentally, in the drawing, the projection pieces provided above the socket 21 are shown by dotted lines. As a result, misinsertion of the power source line plug 40 can be prevented. Further, a gap is formed between the upper projection pieces 52, and hence a projection piece provided at an upper part of the communication line plug can be pushed down through the gap between the projection pieces 52. Further, although the projection pieces 52 are provided, the communication line plug inserted into the communication line socket 21 can be easily pulled out of the socket 21.

Furthermore, the abutment section need not be the one provided on the casing 13, but may be a part of the outer wall of the casing 13. For example, as shown in FIG. 11, the communication line socket 21 may be provided at a position apart from the outer wall surface by a depth b (c<a+b). With such a structure, even when the power source line plug 40 is inserted into the communication line socket 21 by mistake, the power source line plug 40 abuts against the outer wall surface, and hence the metallic terminals 26 are not damaged.

Incidentally, in the example described above, although the communication line socket 21 has been explained as shown in the drawings, the present invention is not limited to the communication line socket 21 described above. Further, although the power source line plug 40 and the power source line socket 20 are configured as shown in the drawings, the present invention is not limited to the power source line plug and the power source line socket described above, and other shapes may be employed. Further, the projection piece 30 may be a rib for reinforcement constituting the casing 13.

Moreover, although the power source line socket 20 and the communication line socket 21 are provided on the backside surface of the computer main body 12 so as to be separate from each other on the right and left, the present invention is not limited to this. For example, the sockets 20 and 21 may be provided so as to be adjacent to each other, or one of them may be provided on the lateral side of the computer main body 12. Furthermore, the present invention is not limited to a portable computer, and may be applied to a desktop computer.

While certain embodiments of the inventions have been described, there embodiments have been presented by way of example only, and are not intended to limit the scope of the invention. Indeed, the novel methods and systems described herein may be embodied in a variety of other forms; furthermore various omissions, substitutions and changes in the form of the methods and system described herein may be made without departing form the spirit of the inventions. The accompanying claims and their equivalents are intended to cover such form or modifications as would fall within the scope and sprit of the inventions.

What is claimed is:

1. An electronic apparatus comprising:
    a communication line socket which is provided on a backside surface of a casing of the electronic apparatus, into which a communication line plug is inserted so that the plug can be freely inserted into and pulled out of the socket, and in which the inserted communication line plug and metallic terminals provided in the communication line socket are electrically connected to each other, the metallic terminals extending away from an opening of the communication line socket;
    a power source line socket which is provided on the backside surface of the casing of the electronic apparatus, into which a power source line plug is inserted so that the plug can be freely inserted into and pulled out of the socket; and
    abutment sections being projection pieces formed in a vicinity of the communication line socket, each of the abutment sections is caused to rise at a position in the vicinity of the communication line socket, and abuts against a finger grip section of the power source line plug when the power source line plug is inserted into the communication line socket, wherein a length from an upper end of the abutment section to the metallic terminal is greater than a length of an insertion section of the power source line plug inserted into the power source line socket when the power source line plug is inserted into the power source line socket,
    wherein one of the communication line socket and the power source line socket is provided at an end part on one of the right and left sides of the backside surface of the electronic apparatus, and the other of the sockets is provided at an end part on the other of the right and left sides of the backside surface of the electronic apparatus.

2. The electronic apparatus according to claim 1, wherein the projection pieces are formed on both the right and left sides of the communication line socket.

3. The electronic apparatus according to claim 1, wherein the electronic apparatus is a portable computer constituted of a computer main body, and a display unit attached to the computer main body so as to be rotatable, and the casing of the electronic apparatus serves as a casing of the computer main body.

4. An electronic apparatus comprising:
    a computer main body;
    a display unit attached to the computer main body so as to be rotatable;
    a communication line socket which is provided at an end part on one of the right and left sides of the backside surface of the computer main body, into which a communication line plug is inserted so that the plug can be freely inserted into and pulled out of the socket, and in which the inserted communication line plug and metallic terminals provided in the communication line socket are electrically connected to each other, the metallic terminals extending away from an opening of the communication line socket;
    a power source line socket which is provided at an end part on one of the right and left sides of the backside surface of the computer main body opposite to the side on which the communication line socket is provided, and into which a power source line plug is inserted so that the plug can be freely inserted into and pulled out of the socket; and
    abutment sections being projection pieces formed in a vicinity of the communication line socket, each of the abutment sections is caused to rise at a position in the vicinity of the communication line socket, and abuts against a finger grip section of the power source line plug when the power source line plug is inserted into the communication line socket, wherein a length from an upper end of the abutment section to the metallic terminal is greater than a length of an insertion section of the power source line plug inserted into the power source line socket when the power source line plug is inserted into the power source line socket.

* * * * *